United States Patent [19]
Long et al.

[11] Patent Number: 6,042,908
[45] Date of Patent: Mar. 28, 2000

[54] PROCESS FOR IMPROVING THE FLAVOR RETAINING PROPERTY OF POLYESTER/ POLYAMIDE BLEND CONTAINERS FOR OZONATED WATER

[75] Inventors: Timothy Edward Long, Blountville; Shriram Bagrodia, Kingsport, both of Tenn.; Annick Moreau, St. Paul en Chablais; Vincent Duccase, Bordeaux, both of France

[73] Assignee: Eastman Chemical Company, Kingsport, Tenn.

[21] Appl. No.: 08/910,606

[22] Filed: Aug. 13, 1997

Related U.S. Application Data

[60] Provisional application No. 60/024,300, Aug. 22, 1996.

[51] Int. Cl.[7] .............................. B01J 15/00; C08L 67/02
[52] U.S. Cl. ................. 428/35.7; 206/524.1; 206/524.6; 428/36.6; 428/36.92; 525/425
[58] Field of Search .................. 428/35.7, 36.6, 428/36.92, 480; 525/425; 206/524.1, 524.6

[56] References Cited

U.S. PATENT DOCUMENTS

| | | |
|---|---|---|
| 4,052,481 | 10/1977 | Asahara et al. . |
| 4,837,115 | 6/1989 | Igarashi et al. . |
| 5,258,233 | 11/1993 | Mills et al. . |
| 5,266,233 | 11/1993 | Houghton et al. . |
| 5,340,884 | 8/1994 | Mills et al. . |
| 5,362,784 | 11/1994 | Brodie, III et al. . |
| 5,650,469 | 7/1997 | Long et al. ............................. 525/425 |

FOREIGN PATENT DOCUMENTS

| | | |
|---|---|---|
| 50-5735 | 3/1975 | Japan . |
| 50-5751 | 3/1975 | Japan . |
| 50-10196 | 4/1975 | Japan . |
| 50-29697 | 9/1975 | Japan . |
| 50-1156 | 11/1975 | Japan . |
| 92/317959 | 11/1992 | Japan . |

OTHER PUBLICATIONS

Fr. Rev. Sci. Eau (1995), 8(3), 333–54 (Summary).
J. Poly. Sci.: Part A Polymer Chemistry, 34, 3573, 1996.
J. Dairy Sci. (1994), 74 (1), 96–9.
The First International Symposium on Ozone for Water and Wastewater Treatment, vol. 1, Dec. 2–5, 1973, The International Ozone Institute, Inc. Rice & Browning.
Chemical Abstracts, vol. 115, No. 6, Aug. 12, 1991, Columbus, Ohio, US; Abstract No. 56816, White, C. H. et al: Ozonation Effect on Taste in Water Packaged in High Density Polyethylene.
J. Dairy Sci. (1991), 74(1), 96–9 Coden: JDSCAE; ISSN: 022–0302, 1991.
Database WPI, Section Ch, Week 8847, Derwent Publications Ltd., London, GB; Class A23, AN 88–336105 Poly-(ethylene naphthalenedicarboxylate) Polymers and Polyamide(s)—Useful for Research Disclosure, vol. 294,No. 061, Oct. 10, 1988, Emsworth, GB.
Research Disclosure, vol. 294 No. 061, Oct. 10, 1988, Emsworth, GB.

*Primary Examiner*—Ellis Robinson
*Assistant Examiner*—Sandra M. Nolan
*Attorney, Agent, or Firm*—Karen A. Harding; Harry J. Gwinnell

[57] ABSTRACT

The present invention relates to a process for minimizing the formation of undesirable byproducts in ozonated liquids comprising the steps of:

providing a container comprising a polyester comprising repeat units from a dicarboxylic acid component comprising at least about 85 mole percent terephthalic acid, 2,6-naphthalenedicarboxylic acid or a mixture thereof and at least about 85 mole percent ethylene glycol; and from about—to about—weight % of at least one polyamide which displays a melting point below that of said polyester, and filling said container with an ozonated liquid.

13 Claims, No Drawings

PROCESS FOR IMPROVING THE FLAVOR RETAINING PROPERTY OF POLYESTER/POLYAMIDE BLEND CONTAINERS FOR OZONATED WATER

This patent application claims the benefit of U.S. Provisional Patent Application, serial number 60/024,300, filed on Aug. 22, 1996.

FIELD OF THE INVENTION

The polyester container market for carbonated and still mineral water and other liquid products requires exceptionally low levels of acetaldehyde (AA) and/or other flavor-affecting compounds which can contribute to undesirable taste. Ozonation via treatment with free ozone, which is frequently used to purify such liquid products, especially water, can result in formation of these flavor-affecting compounds as byproducts of the ozonation process. The present invention relates to containers capable of preventing generation of AA or other flavorants which result as a byproduct from the ozonation process.

BACKGROUND OF THE INVENTION

AA is an inherent side product which is generated during the polymerization melt phase and subsequent processing of PET and other polyesters into useful articles such as containers. Some amount of residual AA may remain in the finished articles. The amount of residual AA level depends in part on the conditions used to process. For example, poly(ethylene terephthalate) (PET) resin prepared using dimethyl terephthalate (DMT) leads to typically 9–10 ppm AA in the bottle sidewall; however, terephthalic acid (TPA) based PET resins lead to much lower levels of AA in the bottle sidewall, i.e., 5–6 ppm. Despite the significant improvement in the TPA based resins, this level of AA is still perceived to be too high. In fact, customer taste testing has indicated that consumers can taste about 20 ppb differences in AA. Consequently, there has been significant customer interest in reducing the residual AA content as low as possible.

Because water contains various contaminants it is desirably disinfected prior to bottling. Chlorination and ozonation are two common methods for disinfecting spring water. The ozonation process leaves residual ozone in the water which is subsequently bottled. Ozonated water stored in conventional PET containers may acquire an undesirable taste due to the presence of various flavorants such acetaldehyde and/or other compounds, some of which may be the byproduct of the ozonation process. Thus, it is highly desirable to provide containers for use with ozonated water that have acceptable flavor retaining properties and clarity.

U.S. Pat. No. 5,258,233 discloses the use of a blend of a low molecular weight polyamide with PET to reduce acetaldehyde. In this patent, it is stated that less than 2% polyamide should be used to minimize color and haze. Similarly, U.S. Pat. No. 5,266,233 discloses the use of a blend with low molecular weight polyamide with PET copolyesters to reduce acetaldehyde. U.S. Pat. No. 5,340,884 discloses the art of precompounding the polyamide with polyesters to create a concentrate that can be diluted with a polyester and still yield the desired properties.

Jammes et al describe the formation and behavior of some keto acids and aldehydes in drinking water treatment process including an ozonation step (Fr. Rev. Sci. Eau (1995), 8(3), 333–54). Specific disinfection byproducts may also induce immediate water quality deterioration due to the objectionable organoleptic properties. Anderson et al describe in Can. Proc. Water Qual. Technol. Conf. (1994), Pt. 1, 871–908 the ozone byproduct formation in three different types of surface waters. Ozonation byproducts which were examined in this study included: acetaldehyde, propanol, butanol, pentanol, hexanol, heptanol, octanol, benzaldehyde, glyoxal, and methyl-glyoxal, oxalic acid, pyruvic acid, oxalacetic acid, and similar organic compounds.

U.S. Pat. No. 5,362,784 disclosed compositions of poly-alkylene imine (PAI). Particularly polyethylene imine (PEI) and polyester polymers, including copolymers and derivatives thereof; such compositions can be used in producing films and devices which are capable of scavenging unwanted aldehydes. However, there is no disclosure regarding the use of ozonated water in containers made from the resin blends.

J. Poly. Sci: Part A Polymer Chemistry, 34, 3573(1996) disclosed the use of N-dialkyl amides, particularly dimethyl acetamide as sacrificial ozone scavengers, in the preparation of functional polystyrene. The publication does not disclose the use of polyamides either separately or in combination with polyesters. In addition, there is no indication that the dialkyl amides improve the flavor of ozonated water packaged in polyester containers.

JP 92-317959 921104 discloses the use of ozone for the disinfection of water, typical process and concerns known in the industry. The patent does not describe the use of polyamides as a method to improve the taste of the ozonated water.

J. Dairy Sci. (1994), 74(1), 96–9 describes the describes the effect of ozone on the taste of water packaged in poly(ethylene) containers. The "off-taste" generated during ozonation could be controlled by the treatment of the containers with butylated hydroxytoluene (BHT, 185 ppm). The publication does not describe the "off-taste" in polyester containers, nor the use of polyamides to improve the flavor of the water.

DESCRIPTION OF THE INVENTION

The present invention relates to a process for minimizing the formation of undesirable byproducts in ozonated liquids comprising the steps of:

providing a container comprising a polyester comprising repeat units from a dicarboxylic acid component comprising at least about 85 mole percent terephthalic acid, 2,6-naphthalenedicarboxylic acid or a mixture thereof and at least about 85 mole percent ethylene glycol; and from about 0.05 to about 2 weight % of at least one polyamide which displays a melting point below that of said polyester, and filling said container with an ozonated liquid.

We have surprisingly discovered that the presence of certain additives in polyester based beverage containers reduces the "off-taste" which is imparted to a liquid, such as water by a disinfection process such as ozonation.

Polyesters

The polyester, component, of the present invention is a polyethylene terephthalate (PET) or polyethylene naphthalate (PEN) resin. Copolyesters and blends of PET and PEN can also be used. The polyethylene terephthalate resin contains repeat units from at least 85 mole percent terephthalic acid and at least 85 mole percent ethylene glycol, while the PEN resin contains repeat units from at least 85 mole percent 2,6-naphthalene-dicarboxlic acid and at least 85% ethylene glycol, based on 100 mole percent dicarboxylic acid and 100 mole percent diol.

The dicarboxylic acid component of the polyester may optionally be modified with up to about 15 mole percent of one or more different dicarboxylic acids other than terephthalic acid or suitable synthetic equivalents such as dimethyl terephthalate. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, isophthalic acid, naphthalenedicarboxylic acid (including, but not limited to the 2,6-isomer), cyclohexanedicarboxylic acid, cyclohexanediacetic acid, diphenyl4,4'-dicarboxylic acid, succinic acid, glutaric acid, adipic acid, azelaic acid, sebacic acid, and the like. Examples of dicarboxylic acids to be included with naphthalene-2,6-dicarboxylic acid are phthalic acid, terephthalic acid, isophthalic acid, other isomers of naphthlenedicarboxylic acid, cyclohexanedicarboxylic acid, cyclohexanediacetic acid, diphenyl4,4'-dicarboxylic acid, succinic acid, glutaric acid, adipic acid, azelaic acid, sebacic acid, and the like. Polyesters may be prepared from two or more of the above dicarboxylic acids.

It should be understood that use of the corresponding acid anhydrides, esters, and acid chlorides of these acids is included in the term "dicarboxylic acid".

In addition, the polyester component may optionally be modified with up to about 15 mole percent, of one or more different diols other than ethylene glycol. Such additional diols include cycloaliphatic diols preferably having 6 to 20 carbon atoms or aliphatic diols preferably having 3 to 20 carbon atoms. Examples of such diols to be included with ethylene glycol are: diethylene glycol triethylene glycol, 1,4-cyclohexanedimethanol, propane-1,3-diol, butane-1,2-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxy-cyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. Polyesters may be prepared from two or more of the above diols.

The polyethylene terephthalate resin may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

Preferably said PET polyesters comprise at least about 90 mole % terephthalic acid or dimethyl terephthalate and about 90 mole % ethylene glycol residues Polyethylene terephthalate based polyesters of the present invention can be prepared by conventional polycondensation procedures well-known in the art. Such processes include direct condensation of the dicarboxylic acid(s) with the diol(s) or by ester interchange using a dialkyl dicarboxylate. For example, a dialkyl terephthalate such as dimethyl terephthalate is ester interchanged with the diol(s) at elevated temperatures in the presence of a catalyst. The polyesters may also be subjected to solid state polymerization methods. PEN polyesters may also be prepared by well known polycondensation procedures.

Many other ingredients can be added to the compositions of the present invention to enhance the performance properties of the polyesters. For example, crystallization aids, impact modifiers, surface lubricants, denesting agents, stabilizers, antioxidants, ultraviolet light absorbing agents, metal deactivators, colorants, nucleating agents, fillers and the like can be included. All of these additives and many others and their use are well known in the art and do not require extensive discussion. Therefore, only a limited number will be referred to, it being understood that any of these compounds can be used so long as they do not hinder the present invention from accomplishing its objects.

Ozone Scavenging Compounds

Applicants have surprisingly found that a number of compounds which are known to reduce residual AA in polyesters also act as ozone scavengers when incorporated into containers for ozonated substances. Suitable ozone scavenging compounds include high molecular weight polyamides such as those disclosed in U.S. Pat. No. 4,837,115; polyamides, polyalkylene phenylene ester and polyalkylene phenylene ester ethers such as those disclosed in U.S. Pat. No. 4,052,481; polyalkylene imines particularly polyethylene imines such as those disclosed in U.S. Pat. No. 5,362,784; and low molecular weight polyamides such as those disclosed in in U.S. Pat. No. 5,340,884. Compounds having superior ozone scavaging capabilities and polyester compatibility are preferred. Suitable ozone scavaging compounds display a melting point below the melting point of the polyester (PEN, PET or blends thereof). Preferably said ozone scavaging compound is a polyamide and more preferably is a polyamide selected from the group consisting of low molecular weight partially aromatic polyamides having a number average molecular weight of less than 15,000, low molecular weight aliphatic polyamides having a number average molecular weight of less than 7,000 and wholly aromatic polyamides.

Combinations of such polyamides are also included within the scope of the invention. By "partially aromatic polyamide" it is meant that the amide linkage of the partially aromatic polyamide contains at least one aromatic ring and a nonaromatic species.

The partially aromatic polyamides have an I.V. of less than about 0.8 dL/g. Preferably the I.V. of the partially aromatic polyamides is less than about 0.7 dL/g and the number average molecular weight is less than about 12,000.

The aliphatic polyamides have an I.V. of less than about 1.1 dL/g. Preferably the I.V. of the aliphatic polyamides is less than about 0.8 dL/g and the number average molecular weight is less than about 6,000. Wholly aromatic polyamides comprise in the molecule chain at least 70 mole % of structural units derived from m-xylylene diamine or a xylylene diamine mixture comprising m-xylylene diamine and up to 30% of p-xylylene diamine and an αε-aliphatic dicarboxylic acid having 6 to 10 carbon atoms, which are further discribed in Japanese Patent Publications No. 1156/75, No. 5751/75, No. 5735/75 and No. 10196/75 and Japanese Patent Application Laid-Open Specification No. 29697/75. Preferably the ozone scavengers of the present invention are selected from the low molecular weight polyamides described in U.S. Pat. No. 5,340,884.

Low molecular weight polyamides formed from isophthalic acid, terephthalic acid, cyclohexanedicarboxylic acid, meta- or para-xylylene diamine, 1,3- or 1,4-cyclohexane (bis)methylamine, aliphatic diacids with 6 to 12 carbon atoms, aliphatic amino acids or lactams with 6 to 12 carbon atoms, aliphatic diamines with 4 to 12 carbon atoms, and other generally known polyamide forming diacids and diamines can be used. The low molecular weight polyamides may also contain small amounts of trifunctional or tetrafunctional comonomers such as trimellitic anhydride, pyromellitic dianhydride, or other polyamide forming polyacids and polyamines known in the art.

Preferred low molecular weight partially aromatic polyamides include: poly(m-xylylene adipamide), poly(hexamethylene isophthalamide), poly(hexamethylene adipamide-co-isophthalamide), poly(hexamethylene adipamide-co-terephthalamide), and poly(hexamethylene isophthalamide-co-terephthalamide). The most preferred low molecular weight partially aromatic polyamide is poly (m-xylylene adipamide) having a number average molecular weight of about 4,000 to about 7,000 and an inherent viscosity of about 0.3 to about 0.6 dL/g.

Preferred low molecular weight aliphatic polyamides include poly(hexamethylene adipamide) and poly (caprolactam). The most preferred low molecular weight aliphatic polyamide is poly(hexamethylene adipamide) having a number average molecular weight of about 3,000 to about 6,000 and an inherent viscosity of 0.4 to 0.9 dL/g. Low molecular weight partially aromatic polyamides, are preferred over the aliphatic polyamides where clarity and dispersibility are crucial.

Preferred low molecular weight aliphatic polyamides include polycapramide (nylon 6), poly-ω-aminoheptanoic acid (nylon 7), poly-ω-aminonanoic acid (nylon 9), polyundecane-amide (nylon 11), polyaurylactam (nylon 12), polyethylene-adipamide (nylon 2,6), polytetramethylene-adipamide (nylon 4,6), polyhexamethylene-adipamide (nylon 6,6), polyhexamethylene-sebacamide (nylon 6,10), polyhexamethylene-dodecamide (nylon 6,12), polyoctamethylene-adipamide (nylon 8,6), polydecamethylene-adipamide (nylon 10,6), polydodecamethylene-adipamide (nylon 12,6) and polydodecamethylene-sebacamide (nylon 12,8).

The low molecular weight polyamides are generally prepared by melt phase polymeization from a diacid-diamine complex which may be prepared either in situ or in a separate step. In either method, the diacid and diamine are used as starting materials. Alternatively, an ester form of the diacid may be used, preferably the dimethyl ester. If the ester is used, the reaction must be carried out at a relatively low temperature, generally 80 to 120° C., until the ester is converted to an amide. The mixture is then heated to the polymerization temperature. In the case of polycaprolactam, either caprolactam or 6-aminocaproic acid can be used as a starting material and the polymerization may be catalyzed by the addition of adipic acid/hexamethylene diamine salt which results in a nylon 6/66 copolymer. When the diacid-diamine complex is used, the mixture is heated to melting and stirred until equilibration.

The molecular weight is controlled by the diacid-diamine ratio. An excess of diamine produces a higher concentration of terminal amino groups. If the diacid-diamine complex is prepared in a separate step, excess diamine is added prior to the polymerization. The polymerization can be carried out either at atmospheric pressure or at elevated pressures.

The composition or articles of the present invention may contain up to about two weight percent of the low molecular weight polyamides, preferably between about 0.05 to about 2 weight % of the polyester and more preferably less than about one weight percent. It has been determined that the use of polyamides at greater than about two weight percent based on the weight of the polyester cause undesirable levels of haze.

The ozone scavengers may be added directly to the polyester or may be added through the use of a concentrate.

The process for preparing the polyester/polyamide blends of the present invention involve preparing the polyester and low molecular weight polyamide, respectively, by processes as mentioned previously. The polyester and polyamide are dried in an atmosphere of dried air or dried nitrogen, or under reduced pressure. The polyester and polyamide are mixed and subsequently melt compounded, for example, in a single or twin screw extruder. Melt temperatures must be at least as high as the melting point of the polyester and are typically in the range of 260–310° C. Preferably, the melt compounding temperature is maintained as low as possible within said range. After completion of the melt compounding, the extrudate is withdrawn in strand form, and recovered according to the usual way such as cutting. Instead of melt compounding, the polyester and polyamide may be dry-blended and heat-molded or draw-formed into plastic articles.

The polyamide can be added in the late stages of polyester manufacture. For example, the polyamide can be blended with the molten polyester as it is removed from the polycondensation reactor, before it is pelletized. This method, however, is not desirable if the polyester/polyamide blend will be subjected to solid state polymerization since undesirable color and/or haze may develop during extended time at elevated temperatures.

The ozone scavaging compound may be added directly to the polyester or as a concentrate. Where the ozone scavaging compound is added as a concentrate, the ozone scavaging compound is added to a carrier resin which may be, for example, polycarbonate, polyester copolymer, polyolefin and the like.

Generally the concentrate comprises about 1 to about 99 weight % of a carrier resin comprising a dicarboxylic acid component comprising repeat units from at least about 60 mole percent aromatic dicarboxylic acid selected from the group consisting of terephthalic acid, naphthalenedicarboxylic acid and mixtures thereof, and a diol component comprising repeat units from at least about 50 mole percent ethylene glycol, based on 100 mole percent dicarboxylic acid and 100 mole percent diol and about 1 to about 99 weight % of a polyamide described above. More preferably the carrier resin is about 20 to about 99 and most preferably about 50 to about 99 weight percent.

Generally between about 1 and about 20 weight percent of the concentrate is added to the base resin. More preferably about 1 to about 10 weight percent of the concentrate is added. It should also be understood that the base resin may contain small amounts of the ester form of the acid component, so long as the total amount of the ester form of the polyester/polyamide blend does not exceed about 20 weight %, and preferably not more than about 10 weight %.

It is also understood that the polyamide resin could be added directly to the polymerization melt in a single step as opposed to adding subsequent processing steps.

Ozonation Process

Ozonation is used for the purpose of disinfecting a liquid such as water which has been freed from its gross impurities to improve the odor and taste, and to eliminate dissolved organic matter by means of oxidation and microflocculation. The residual ozone in the disinfected water ranges from 0.1 ppm to 30 ppm ozone, and generally decays over a very short period of time due to the inherent instability (high reactivity) of the ozone molecule. (The First International Symposium on Ozone for Water and Wastewater Treatment, Vol. 1, Dec. 2–5, 1973, The International Ozone Institute, Inc. Rice & Browning)

EXAMPLE

Example 1

Eastapak® PET 9921W, (Eastman Chemical Company, I.V.=0.80) was dried for 6 hours at 150° F. in Patterson dryer. The polyamide based additive (25 weight % polyhexamethylene adipamide (0.43 I.V.) prepared as described in Example 1 U.S. Pat. No. 5,258,233 blended into Eastapak® PET 9921W in a 25:75 wt % ratio) was dried at 65° C. for 8 hours. 100 parts of Eastapak 9921W resin were mixed with 1 part of polyamide based additive, so that a homogeneous "salt and pepper" mix of pellets is achieved. The pellet mix was fed to the extruder of a "HUSKY" injection molding machine and preforms were injection molded using 54 g, 8 cavity mold. All the preforms for this study were selected from the same cavity in the mold.

A temperature of 277° C. was maintained for injection molding and a total cycle time of 27.44 seconds. The preforms were blown into two liter bottles using a SIDEL SB02-3 RBM machine. Bottles were immediately capped. Bottles were filled with ozonated water containing 0.4 ppm ozone and stored at 20° C.

The AA was measured using GC analysis as follows. An equilibruim (static) head space gas chromatographic (EHS-GC) method for the determination of parts per billion (ppb) levels of AA in water was used. 5 gm of water sample was placed in a sealed headspce vial in the presence of 2 gm of soduim chloride and heated at 80 C for 90 min using an automatic headspace sampler. A portion of the head space gas was injected onto a GS-Q megabore capillary GC colum (J&W Scientific). The concentration of AA was then determined by a flame ionization detector (FID). An HP modle 5890A GC model was used. Acetaldehyde (AA) in the water was 3 ppb after storing for 60 days. This is very low level of AA and acceptable for bottled water with no AA taste problem

Example 2 (Control)

In this example, bottles were made from Eastapak PET 9921W resin without any polyamide additive and glass. The processing conditions for the PET control were same as in Example 1. A bottle of the same size and geometry was also made from glass. These bottles were filled with ozonated water containing 0.4 ppm ozone and stored as in Example 1. After 60 days storage, AA level in water stored in PET was 14 ppb and the AA level in the water stored in glass was less than 3 ppb. The AA values are summarized in Table 1, below.

Example 3

Bottles made as in Examples 1 and 2 were filled with ozonated water (0.4 ppm ozone) and stored at 55° C. for 8 days. Acetaldehyde (AA) levels in the water are shown in Table 1, below.

| Bottle type | AA (ppb) 60 days @ 20° C. | AA (ppb) 8 days @ 55° C. | Taste |
| --- | --- | --- | --- |
| PET | 14 | 26 | Undesirable |
| PET + additive | <3 | 3 | None |
| Glass | <3 | <3 | none |

Measured levels for AA in containers with an ozone scavaging compound at both room and elevated temperature are dramatically (5 times) lower than those in unmodified PET.

This level of AA is surprisingly low, given the elevated storage temperatures.

Example 4

The above examples were repeated using non-ozonated water. At both storage conditions the AA levels measured were less than 3 ppm in all three containers (glass, PET and PET with additive). Thus, because AA is not generated in either the glass containers or any of the containers filled with non-ozonated water it is clear that the source of the AA is an undesirable reaction between the unmodified PET and ozone. Thus, prior to the recognition of the reaction between ozonated liquids and polyester containers it was totally unexpected that conventional AA additives would block the undesirable reaction between ozone and PET. Clearly the presence of ozone is somehow responsible for the generation of AA in the water.

We claim:

1. A process for minimizing the formation of undesirable ozone reaction byproducts in ozonated liquids in a container comprising the steps of:

providing a container capable of minimizing the formation of undesirable byproducts in ozonated liquids, which container is made from a polyester/polymide blend containing a polyester comprising repeat units from a dicarboxylic acid component comprising at least about 85 mole percent terephthalic acid, 2,6-naphthalenedicarboxylic acid or a mixture thereof, based on 100 mole percent of said dicarboxylic acid component, and a diol component comprising at least about 85 mole percent ethylene glycol, based on 100 mole percent of said diol component; and from about 0.05 to about 2 weight %, based on the weight of said polyester, of at least one polyamide which displays a melting point below that of said polyester, and filling said container with an ozonated liquid whereby said ozonated liquid in the container contains no more acetaldehyde than a non-ozonated liquid in a container formed from said polyester/polymide blend.

2. The process of claim 1 wherein the dicarboxylic acid component further comprises up to about 15 mole percent of at least one second dicarboxylic acid selected from the group consisting of aromatic dicarboxylic acids having 8 to 14 carbon atoms, aliphatic dicarboxylic acids having 4 to 12 carbon atoms, cycloaliphatic dicarboxylic acids having 8 to 12 carbon atoms, and mixtures thereof.

3. The process of claim 2 wherein said second dicarboxylic acid is selected from the group consisting of phthalic acid, isophthalic acid, naphthalenedicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and mixtures thereof.

4. The process of claim 1 wherein said diol component further comprises up to about 15 mole percent of at least one additional diol.

5. The process of claim 4 wherein said additional diol is selected from the group consisting of cycloaliphatic diols having 6 to 20 carbon atoms and aliphatic diols having 3 to 20 carbon atoms.

6. The process of claim 5 wherein said additional diol is selected from the group consisting of diethylene glycol, triethylene glycol, 1,4-cyclohexanedimethanol, propane-1,3-diol, butane-1,2-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxy-cyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane and mixtures thereof.

7. The process of claim 1 wherein said polyamide is selected from the group consisting of low molecular weight partially aromatic polyamides having a number average molecular weight of less than 15,000, low molecular weight aliphatic polyamides having a number average molecular weight of less than 7,000, wholly aromatic polyamides and mixtures thereof.

8. The process of claim 7 wherein said polyamide comprises a low molecular weight partially aromatic polyamide is selected from the group consisting of poly(m-xylylene adipamide), poly(hexamethylene isophthalamide), poly(hexamethylene adipamide-co-isophthalamide), poly(hexamethylene adipamide-co-terephthalamide), poly(hexamethylene isophthalamide-co-terephthalamide) and mixtures thereof.

9. The process of claim 8 wherein said low molecular weight partially aromatic polyamide is poly(m-xylylene adipamide) having a number average molecular weight of about 4,000 to about 7,000 and an inherent viscosity of about 0.3 to about 0.6 dL/g.

10. The process of claim 7 wherein said polyamide comprises at least one low molecular weight aliphatic polyamide selected from the group consisting of polycapramide (nylon 6), poly-ω-aminoheptanoic acid (nylon 7), poly-ω-aminononanoic acid (nylon 9), polyundecane-amide (nylon 11), polyaurylactam (nylon 12), polyethylene-adipamide (nylon 2,6), polytetramethylene-adipamide (nylon 4,6), polyhexamethylene-adipamide (nylon 6,6), polyhexamethylene-sebacamide (nylon 6,10), polyhexamethylene-dodecamide (nylon 6,12), polyoctamethylene-adipamide (nylon 8,6), polydecamethylene-adipamide (nylon 10,6), polydodecamethylene-adipamide (nylon 12,6) and polydodecamethylene-sebacamide (nylon 12,8).

11. The process of claim 7 wherein said polyamide comprises a low molecular weight aliphatic polyamide selected from the group consisting of poly(hexamethylene adipamide), poly(caprolactam) and mixtures thereof.

12. The process of claim 7 where in said polyamide comprises poly(hexamethylene adipamide) having a number average molecular weight of about 3,000 to about 6,000 and an inherent viscosity of 0.4 to 0.9 dL/g.

13. A container containing a liquid and being capable of minimizing the formation of undesirable byproducts in ozonated liquids, which container is made from a polyester/polymide blend containing a polyester comprising repeat units from a dicarboxylic acid component comprising at least about 85 mole percent terephthalic acid, 2,6-naphthalenedicarboxylic acid or a mixture thereof, based upon 100 mole percent of said dicarboxylic component and a diol component comprising at least about 85 mole percent ethylene glycol, based upon 100 mole percent of said diol component; and from about 0.05 to about 2 weight %, based upon the weight of said polyester, of at least one polyamide which displays a melting point below that of said polyester, wherein said container is filled with an ozonated liquid which contains no more ozone generated acetaldehyde than a non-ozonated liquid in a container formed from said polyester/polymide blend.

* * * * *